US011308329B2

(12) United States Patent
Salamon et al.

(10) Patent No.: US 11,308,329 B2
(45) Date of Patent: Apr. 19, 2022

(54) REPRESENTATION LEARNING FROM VIDEO WITH SPATIAL AUDIO

(71) Applicant: Adobe Inc., San Jose, CA (US)

(72) Inventors: Justin Salamon, San Francisco, CA (US); Bryan Russell, San Francisco, CA (US); Karren Yang, Medford, MA (US)

(73) Assignee: Adobe Inc., San Jose, CA (US)

( * ) Notice: Subject to any disclaimer, the term of this patent is extended or adjusted under 35 U.S.C. 154(b) by 89 days.

(21) Appl. No.: 16/868,805

(22) Filed: May 7, 2020

(65) Prior Publication Data

US 2021/0350135 A1 Nov. 11, 2021

(51) Int. Cl.
*G06K 9/00* (2006.01)
*H04S 7/00* (2006.01)
*G06K 9/62* (2006.01)

(52) U.S. Cl.
CPC ..... *G06K 9/00718* (2013.01); *G06K 9/00744* (2013.01); *G06K 9/6256* (2013.01); *G06K 9/6262* (2013.01); *H04S 7/30* (2013.01); *H04S 2420/11* (2013.01)

(58) Field of Classification Search
CPC combination set(s) only.
See application file for complete search history.

(56) References Cited

U.S. PATENT DOCUMENTS

| 2004/0240686 | A1* | 12/2004 | Gibson | G10H 1/0008 |
| | | | | 381/119 |
| 2013/0063550 | A1* | 3/2013 | Ritchey | G06F 3/015 |
| | | | | 348/36 |
| 2017/0061966 | A1* | 3/2017 | Marcheret | G06K 9/00718 |
| 2020/0219492 | A1* | 7/2020 | Apsingekar | G06N 3/08 |

OTHER PUBLICATIONS

Pedro Morgado,"Self-Supervised Generation of Spatial Audio for 360 Video",Jul. 9, 2018,32nd Conference on Neural Information Processing Systems (NIPS 2018), Montréal, Canada,pp. 1-8.*

(Continued)

*Primary Examiner* — Omar S Ismail
(74) *Attorney, Agent, or Firm* — Kilpatrick Townsend & Stockton LLP

(57) ABSTRACT

A computer system is trained to understand audio-visual spatial correspondence using audio-visual clips having multi-channel audio. The computer system includes an audio subnetwork, video subnetwork, and pretext subnetwork. The audio subnetwork receives the two channels of audio from the audio-visual clips, and the video subnetwork receives the video frames from the audio-visual clips. In a subset of the audio-visual clips the audio-visual spatial relationship is misaligned, causing the audio-visual spatial cues for the audio and video to be incorrect. The audio subnetwork outputs an audio feature vector for each audio-visual clip, and the video subnetwork outputs a video feature vector for each audio-visual clip. The audio and video feature vectors for each audio-visual clip are merged and provided to the pretext subnetwork, which is configured to classify the merged vector as either having a misaligned audio-visual spatial relationship or not. The subnetworks are trained based on the loss calculated from the classification.

18 Claims, 6 Drawing Sheets

(56) References Cited

OTHER PUBLICATIONS

Andrew Owens,"Audio-Visual Scene Analysis with Self-Supervised Multisensory Features",Sep. 2018, Proceedings of the European Conference on Computer Vision (ECCV),pp. 2-13.*
Naoya Takahashi,"AENet: Learning Deep Audio Features for Video Analysis",IEEE Transactions on Multimedia, vol. 20, No. 3, Mar. 2018,pp. 513-520.*
Arandjelovic, et al., "Look, Listen and Learn", Proceedings of the IEEE International Conference on Computer Vision, pp. 609-617, May 23, 2017.
Bonada, et al., "Demixing commercial Music Productions via Human-Assisted Time-Frequency Masking", 120th AES Convention, Paris, May 20-23, 2006.
Gao, et al., "2.5 d Visual Sound", Proceedings of the IEEE conference on Computer Vison and Pattern Recognition, pp. 324-333, Jun. 16-20, 2019.
Kaiming He, Xiangyu Zhang, Shaoqing Ren, and Jian Sun, "Deep residual learning for image recognition", In Proceedings of the IEEE conference on computer vision and pattern recognition, pp. 770-778, published 2016, submitted Dec. 10, 2015.
Owens, et al., "Audio-visual scene analysis with self-supervised multisensory features", Proceedings of the European Conference on Computer Vision, pp. 631-648, Oct. 9, 2018.

* cited by examiner

REPRESENTATION LEARNING FROM VIDEO WITH SPATIAL AUDIO

TECHNICAL FIELD

This disclosure relates generally to computer implemented methods and systems for understanding audio-visual spatial correspondence. More specifically, the present disclosure involves training and implementing a neural network that understand audio-visual spatial correspondence based on audio and video input.

BACKGROUND

Humans have the ability to establish spatial correspondences between visual and auditory senses. Humans' ability to establish audio-visual spatial correspondences enables us to interpret and navigate the world more effectively (e.g., a loud clatter draws our visual attention in the direction of the noise, and, when interacting with a group of people, humans use spatial cues to differentiate different speakers). Computers (e.g., machines, robots, and the like) lack the ability to understand audio-visual spatial correspondence. However, such understanding could allow computers to interact more seamlessly with the real world. Existing techniques for teaching computers to understand audio-visual spatial correspondence have had little success and generally require large amounts of annotated data to facilitate the machine learning.

BRIEF SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer-implemented method for training a network to interpret audio-visual spatial correspondence. The method is performed by a training system and includes obtaining, by a preprocessing subsystem, audio-visual samples. The preprocessing subsystem extracts, from each audio-visual sample, audio channels and video frames. The preprocessing subsystem misaligns the audio-visual spatial relationship in each of a first subset of the audio-visual samples (e.g., 50% of the samples are misaligned). The system, for each of the audio-visual samples (some of which are misaligned) calculates, with an audio subnetwork, an audio feature vector for the respective audio-visual sample based on the audio channels of the respective audio-visual sample and calculates, with a visual subnetwork, a visual feature vector for the respective audio-visual sample based on the video frames of the respective audio-visual sample. A merging subsystem merges the audio feature vector with the visual feature vector over a time domain to generate an audio-visual vector. A pretext subnetwork classifies the audio-visual vector based on whether the pretext subnetwork determines if the audio-visual sample represented by the audio-visual vector had the audio-visual spatial relationship misaligned. The system adjusts parameters of the audio subnetwork, visual subnetwork, and pretext subnetwork based on the loss calculated based on the classification of the audio-visual vector. Other embodiments of this aspect include corresponding computer systems, apparatus, and computer programs recorded on one or more computer storage devices, each configured to perform the actions of the methods.

Implementations may include one or more of the following features. In some embodiments, misaligning the audio-visual spatial relationship includes randomly selecting the first subset from the audio-visual samples, and in some embodiments the selection is made using a probability of 0.5. In some embodiments, the audio-visual samples include field-of-view video with binaural audio. In such embodiments, the audio-visual spatial relationship includes audio perceived as coming from a left portion of the video and audio perceived as coming from a right portion of the video, and misaligning includes switching the audio channels. In some embodiments, calculating the audio feature vector for the respective audio-visual sample includes receiving, at the audio subnetwork, a first audio representation representing a first audio channel stacked with a second audio representation representing a second audio channel. In some embodiments, the audio representations are a spectrogram, a mel-spectrogram, or a raw audio waveform. In some embodiments, classifying the audio-visual vector includes average pooling across a single dimension. In some embodiments, adjusting parameters of the audio subnetwork, visual subnetwork, and pretext subnetwork includes receiving, by a loss function subsystem, a known classification for the audio-visual vector and the classification of the audio-visual vector from the pretext subnetwork; calculating the loss based on a determination of whether the pretext subnetwork correctly classified the audio-visual vector using the known classification; and providing the loss to the audio subnetwork, the visual subnetwork, and the pretext subnetwork. In some embodiments, merging the audio feature vector with the visual feature vector over the time domain includes reducing and flattening the visual feature vector without spatial pooling to generate a reduced visual feature vector, and merging the audio feature vector with the reduced visual feature vector over the time domain. In some embodiments, the preprocessing subsystem misaligns the audio-visual spatial relationship in each of a different subset of the audio-visual samples by modifying the audio channels and realigns the audio-visual spatial relationship by modifying the video frames. In some embodiments, the audio-visual samples include 360-degree video and ambisonic audio. In such embodiments, misaligning may include rotating the audio channels around the z-axis by an angle θ. Implementations of the described techniques may include hardware, a method or process, or computer software on a computer-accessible medium.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
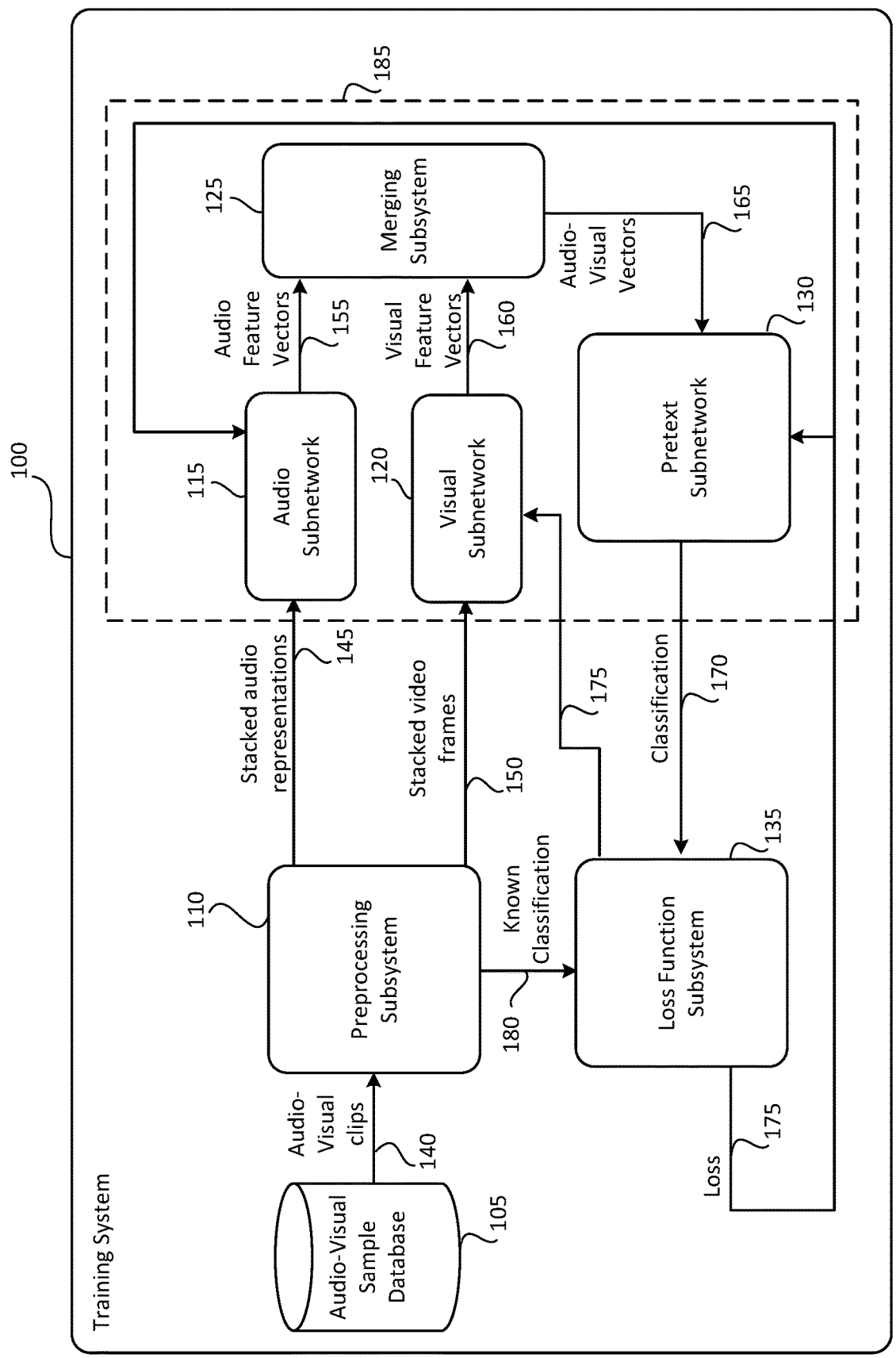
FIG. 1 illustrates an example training system for training a neural network to understand audio-visual spatial correspondence, according to certain embodiments.

The present disclosure involves systems and techniques for teaching a computer to understand audio-visual spatial correspondence using a self-supervised algorithm. As discussed above, a computer may be able to interact more seamlessly with people and the real world if it had the ability to understand audio-visual spatial correspondence. To teach a computer to understand audio-visual spatial correspondence, the described system leverages available data (e.g., audio-visual clips) to teach the computer to match spatial information in the audio stream to the positions of sound sources in the visual stream. The computer is taught by training it to classify a representation of an audio-visual clip based on whether the clip's audio-visual spatial relationship has been misaligned. For example, the misalignment can be created by switching or modifying the audio channels (e.g., left-right audio channels switched) or the video frames (e.g., flipping the video frames) such that the spatial perception of the sound with respect to the video is modified. Learning to determine whether a clip's audio-visual spatial relationship is misaligned (e.g., the audio channels are switched or modified or the video frames are flipped or modified) by relying on the audio-visual information in the clip allows the computer to more generally understand audio-visual spatial cues and correspondence. The task of classifying the audio-visual clips is just a pretext for training the neural network to learn to understand audio-visual spatial cues, so the trained computer can later be used for other downstream tasks that rely on audio-visual spatial correspondence and cues.

A challenge for many types of machine learning is the need for labeled data to train the machine. One advantage to a self-supervised system is that labeled data is not needed. Unlabeled data is abundant. For example, there are many autonomous sensory meridian response (ASMR) videos available online. ASMR videos are particularly useful because they are a class of videos that contain binaural/two channel audio. Binaural audio is one type of stereo audio. There are many other types of videos that contain stereo audio that can be used as well, and ASMR audio-visual clips are just one example of the type of clips that can be used in this system. Regarding ASMR clips, the binaural audio allows the user to watch the videos and hear the audio such that when the speaker in the video is on the left of the screen, the audio sounds like it is coming from the left, and when the speaker in the video is on the right of the screen, the audio sounds like it is coming from the right. These videos and their information can be leveraged to train the computer to understand audio-visual spatial cues in a self-supervised system. Specifically, the audio channels are switched (e.g., the left channel audio is designated as the right channel audio and vice versa) on a portion of the clips, and the computer is trained to use the audio-visual spatial cues to determine whether the audio channels have been switched.

One major advantage of the described systems and methods for training is that it is a self-supervised system. There is no need for expensive and laborious creation of labelled/annotated data. Rather, the system may determine whether to misalign the audio-visual spatial relationship of a clip, and therefore knows whether the relationship has been misaligned.

Turning to FIG. 1, a training system 100 is depicted for training a neural network to understand audio-visual spatial correspondence. The training system 100 includes an audio-visual sample database 105, a preprocessing subsystem 110, a neural network 185, and a loss function subsystem 135. The training system 100 may include one or more computers such as computing device 600 as described with respect to FIG. 6. While certain components, subsystems, and subnetworks are described, more or fewer components, subsystems, and subnetworks may be included in training system 100 and perform the described functionality and remains within the scope of this disclosure.

Audio-visual sample database 105 may be a database of audio-visual clips having multi-channel audio (e.g., stereo, binaural, ambisonic, or the like). In some embodiments, the clips may be obtained online from, for example, an upload website that allows users to upload videos for public consumption. In some embodiments, the clips may be autonomous sensory meridian response (ASMR) videos. In some embodiments, the clips may be any length and segments of the video clips may be obtained for use in the training system 100. For example, video clips may be minutes long, but the clip samples used in training system 100 may be, for example, three-second clips from the longer video clips. In some embodiments, longer video clips may be stored in audio-visual sample database 105 and portions of the video clips may be obtained by the preprocessing subsystem 110.

The preprocessing subsystem 110 may perform preprocessing on the audio-visual clips 140 to prepare the audio-visual clips 140 as input to the audio subnetwork 115 and visual subnetwork 120. For example, preprocessing subsystem 110 can extract the audio channels from the audio-visual clip 140 and the video frames from the audio-visual clip 140. The video frames may be sampled at any suitable rate and/or resized to any suitable size such that each video frame is consistent. For example, the video frames may be sampled at six Hertz (6 Hz) with frames resized to 256×256 pixels. In some embodiments, the color and contrast are shifted as a form of data augmentation. In some embodiments, the audio is sampled at sixteen kiloHertz (16 kHz). The preprocessing subsystem 110 can generate a representation of each audio channel. For example, preprocessing subsystem 100 may generate a log-scaled mel-spectrogram of each audio channel. A mel-spectrogram is generated by using the mel-scale as the y-axis of a spectrogram. The mel-scale is a scale created to separate frequencies into evenly spaced bins where the bins are not evenly spaced based on distance in the frequency dimension, but on distance as it is heard by the human ear. A spectrogram is a representation of the spectrum of frequencies of a signal as it varies with time. In some embodiments, the representation of each audio channel may be a spectrogram, a mel-spectrogram, a log-scaled mel-spectrogram, the raw audio waveform, or any other suitable representation. In some embodiments, to account for possible biases, the audio-visual spatial relationship of a portion of the audio-visual samples are misaligned using either the video frames or the audio channels, and then realigned using the other of the audio channels or the video frames. For example, to account for possible left-right bias, the video frames are flipped and the right and left audio channels are switched. The video frames may be flipped on the vertical axis, such that the right and left sides of the video frame are flipped (e.g., the right of the video frame becomes the left and vice versa). For example, to flip a video frame, the array of pixels for the frame are copied to a new array where the horizontal spatial locations "x" are updated to "−x." As an audio channel switching example, the left audio channel may be copied to a new array designated for the right audio channel, and the right audio channel may be copied to a new array designated for the left audio channel. The training algorithm then uses the copied new arrays. Switching the audio channels and flipping the video frames of a single audio-visual clip at the same time does not affect the audio-visual spatial alignment for that audio-visual clip. In other words, for example, flipping the video frames switches the left-right visual information and switching the left and right audio channels also switches the left-right audio information. Therefore, both the audio and visual information is modified so that the audio-visual spatial alignment is not disrupted.

The preprocessing subsystem 110 also misaligns the audio-visual spatial alignment on a subset of the audio-visual clips. For example, the preprocessing subsystem 110 may switch the right and left audio channels on the subset of the audio-visual clips without a corresponding flipping of the video frames. In some examples, the preprocessing subsystem 110 may flip the video frames of the subset of audio-visual clips without a corresponding switch of the audio channels. This switching disrupts the audio-visual spatial alignment (in other words, misaligns the audio-visual spatial relationship) of this subset of audio-visual clips. In some embodiments, the misalignment is performed on a randomly selected subset of the audio-visual clips 140. In some embodiments, the random selection is performed with a probability of 0.5 (i.e., half of the audio-visual clips have disrupted audio-visual spatial alignment). For example, the preprocessing system 110 switches the audio channels for half of the audio-visual clips so that the left-right audio information for the audio-visual clip is opposite the left-right visual information for the audio-visual clip. It is this disruptive switching that later allows the neural network 170 to learn to understand the audio-visual spatial correspondence by classifying which of the audio-visual clip representations have had their audio-visual spatial relationship misaligned.

The preprocessing subsystem 110 stacks the video frames for a given audio-visual clip 140 and provides the stacked video frames 150 to the visual subnetwork 120. The preprocessing subsystem 110 also stacks the audio representations. For example, preprocessing subsystem 110 may stack a mel-spectrogram representing the right audio channel for a given audio-visual clip 140 with the mel-spectrogram representing the left audio channel for the given audio-visual clip 140. The preprocessing subsystem 110 provides the stacked audio representations 145 to the audio subnetwork 115.

The neural network 185 includes an audio subnetwork 115, a visual subnetwork 120, a merging subsystem 125, and a pretext subnetwork 130. While the neural network 185 is depicted as having certain subnetworks and subsystems, neural network 185 may include more or fewer subnetworks and subsystems to perform the described functionality and remain within the scope of this disclosure.

Audio subnetwork 115 may be a neural network. For example, audio subnetwork 115 may be a convolutional neural network, a convolutional neural network with 2D kernels comprised of stacked convolution layers and activation layers and optionally pooling layers, a stacked residual blocks with squeeze and excitation neural network. In some embodiments, the network may operate directly on the audio waveform rather than an audio representation by applying 1D convolution kernels to the stacked waveforms of the audio channels. Audio subnetwork 115 may be configured to generate an audio feature vector 155 to represent the stacked audio representations 145 (e.g., stacked mel-spectrograms). The audio feature vector 155 is a numerical representation of the audio channel information captured in the stacked audio representations. The neural network learns which features to capture in the audio feature vector 155 as the system is trained. Example details for an audio subnetwork 115 are provided in FIG. 2.

Visual subnetwork 120 may be a neural network. For example, audio subnetwork 115 may be a convolutional neural network. Visual subnetwork 120 may be configured to generate a visual feature vector 160 to represent the stacked video frames 150. The visual feature vector 160 is a numerical representation of the stacked video frames 150. For example, a ResNet-18 convolutional neural network may be used for visual subnetwork 120, and the visual feature vector 160 is generated by the ResNet-18 convolutional neural network based on the stacked video frames 150 provided as input to the visual subnetwork 120. Example details for a visual subnetwork 120 are provided in FIG. 2.

Merging subsystem 125 receives the audio feature vectors 155 and the visual feature vectors 160 and merges (i.e., fuses) the two into an audio-visual vector representing the audio-visual clip 140. In some embodiments, the visual feature vector 160 is flattened and reduced without spatial pooling prior to fusion with the audio feature vector 155. The audio feature vector 155 and the visual feature vector 160 are fused together (i.e., merged) in the time dimension. For example, the visual feature vector 160 may be provided to a one-layer neural network to reduce the feature dimensionality. The visual feature vector 160 is flattened (i.e., reshaped). The audio feature vector 155 and visual feature vector 160 are concatenated in the time dimension. The concatenated feature vector is the audio-visual vector 165. The merged audio-visual vector 165 is provided to the pretext subnetwork 130.

The pretext subnetwork 130 is a classification network used to train the audio subnetwork 115 and visual subnetwork 120 to understand audio-visual spatial cues. The pretext subnetwork 130 is a classification neural network configured to receive the audio-visual vectors 165 and classify them based on determining whether the audio-visual spatial relationship was misaligned by the preprocessing subsystem (e.g., whether the preprocessing subsystem switched or modified the audio channels or the video frames such that the audio-visual spatial alignment was disrupted). The pretext subnetwork 130 classifies each audio-visual vector 165 representing an audio-visual clip and provides the classification 170 to the loss function subsystem 135.

The loss function subsystem 135 may be configured to calculate the loss based on the classification 170 of the audio-visual vectors 165 by the pretext subnetwork 130 and the known classification 180 that the loss function subsystem 135 receives from the preprocessing subsystem 110. The calculated loss 175 is provided to the audio subnetwork 115, visual subnetwork 120, and pretext subnetwork 130, which all use the loss 175 to adjust parameters within the respective neural networks. The parameter adjustment represents each neural network learning to understand the audio-visual spatial correspondence and cues.

Once the neural network 185 and its components are trained using each of the audio-visual clips 140, there may be additional audio-visual clips in the audio-visual sample database 105 or from some other location that are used to test and validate the training. In some embodiments a percentage of the audio-visual clips are used for training and other percentages are used for testing and validation. In some embodiments, eighty percent of the audio-visual clips 140 are used for training, ten percent of the audio-visual clips 140 are used for validation, and ten percent are used for testing. Once the neural network 185 is trained, it may be deployed for use in downstream tasks. There is little use for the pretext subnetwork 130 once the audio subnetwork 115 and visual subnetwork 120 are trained. The trained subnetworks may be deployed independently, or the pretext subnetwork 130 may be removed from neural network 185 for deployment. The trained audio subnetwork 115 and/or visual subnetwork 120 can be used to generate the audio feature vectors 155 and/or visual feature vectors 160, respectively. The merging subsystem 125 may be used to generate the merged audio-visual vectors 165. Any of the vectors may be used for other downstream tasks in which the system may need to understand audio-visual spatial cues. For example, sound source localization, audio spatialization, audio-visual source separation, and the like may be downstream uses for the trained neural network 185 and its components.

The description above and throughout this disclosure describe binaural audio-visual clips having a left and right audio channel as one example of the embodiments. In some embodiments, audio-visual clips may have more than two audio channels. In some additional embodiments, 360-degree video clips with full-sphere first-order ambisonics (FOA) audio are used. FOA extends audio to the 3-dimensional setting, with extra channels to capture sound depth and height at time t: $a(t)=(a_w(t), a_y(t), a_z(t), a_x(t))$, where $a_w(t)$ represents omni-directional sound pressure, and $(a_y(t), a_z(t), a_x(t))$ are front-back, up-down, and left-right sound pressure gradients respectively. FOA is often provided with 360-degree video to give viewers a full-sphere surround image and sound experience. Analogous to the case of stereo audio (e.g., binaural), the neural network is trained to detect whether the visual and audio streams are spatially aligned in 360-degree videos. The model architecture is the same for FOA audio with 360-degree video as for stereo audio with field-of-view video (as described throughout). The primary difference is that the input to the audio subnetwork 115 has four FOA channels instead of multiple stereo channels (e.g., binaural two channel stereo audio). In such embodiments, to generate the misaligned samples (i.e., samples in which the audio-visual spatial information is misaligned) the channels may be, for example, transformed using the following transformation: $\tilde{d}(t)=(a_w(t), a_x(t)\sin\theta + a_y(t)\cos\theta, a_z(t), a_x(t)\cos\theta - a_y(t)\sin\theta)$. This transformation rotates the audio about the z-axis by $\theta$.

Figure 2:
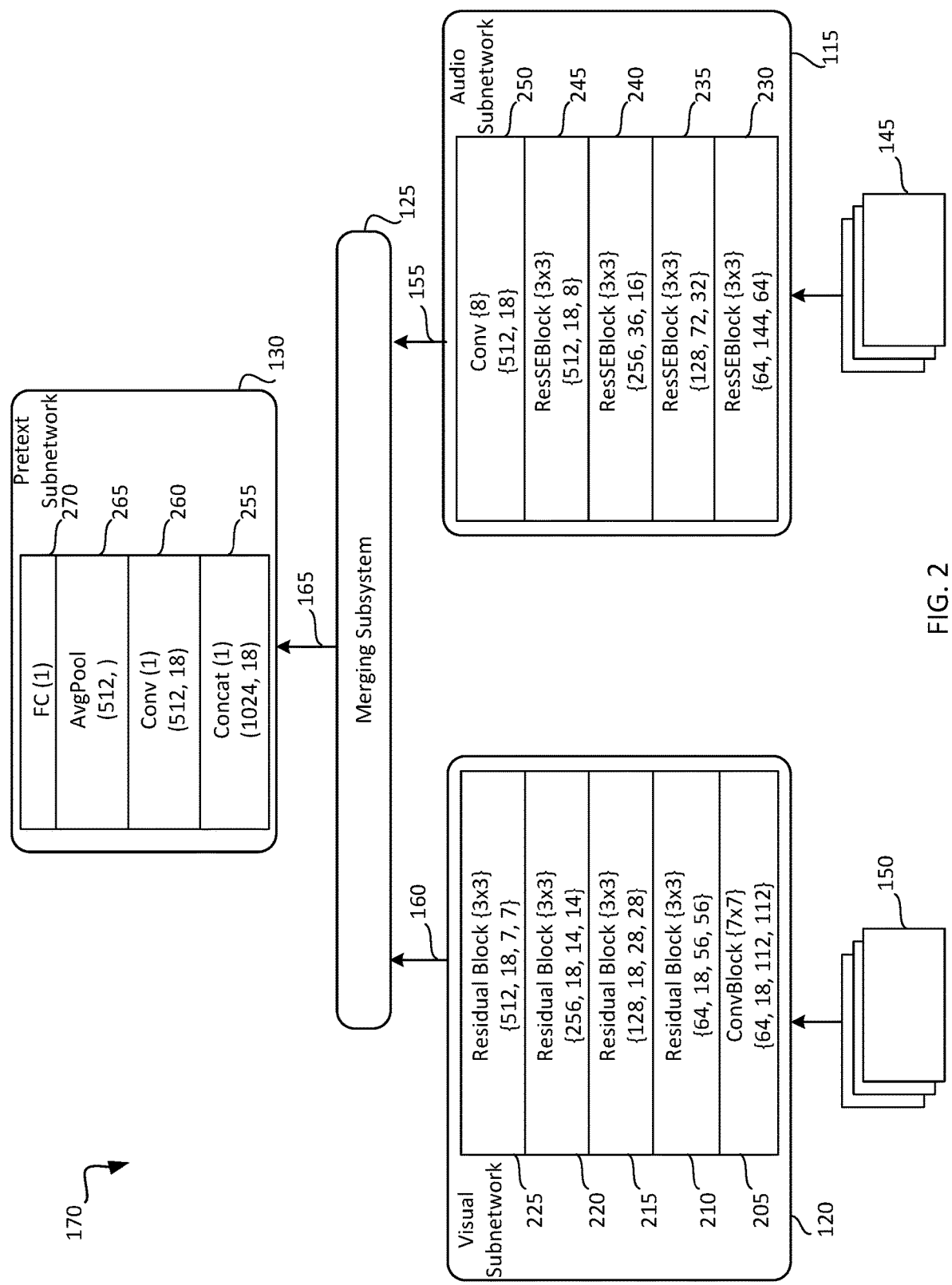
FIG. 2 illustrates example details of the training system of FIG. 1, according to certain embodiments.

FIG. 2 illustrates additional details for an example neural network 185. The stacked video frames 150 are provided to the visual subnetwork 120. The visual subnetwork 120 may be a convolutional neural network having multiple layers. In the example depicted in FIG. 2, visual subnetwork 120 includes a convolution layer 205 and multiple residual block layers 210, 215, 220, and 225. Visual subnetwork 120 may contain any number of layers. In some embodiments visual subnetwork 120 includes eighteen layers (e.g., ResNet-18 convolutional neural network). As shown in FIG. 2, each layer has a type of layer (e.g., convolutional block or residual block), a size of the spatial filter for the block (e.g., 7×7 or 3×3), and information about the frames. The information about the frames includes the frame's number of output feature channels (C), number of sampled frames (T), width of the frame (W), and height of the frame (H) in the format {C, T, W, H}. Accordingly, for convolutional block 205, the number of output feature channels is 64, the number of sampled frames is 18, the height is 112 pixels, and the width is 112 pixels. The example shown in FIG. 2 is for illustration and description purposes, and a visual subnetwork 120 may include more or fewer layers as well as various other values for those described including the spatial filters, sampling rate, output feature channels, height, width, and so forth. The visual subnetwork 120 outputs a visual feature vector 160 based on the stacked video frames 150.

The stacked audio representations 145 are provided to the audio subnetwork 115. The audio subnetwork 115 may be stacked residual blocks with squeeze and excitation. In the example depicted in FIG. 2, audio subnetwork 115 includes four stacked residual block layers 230, 235, 240, and 245 and a convolutional layer 250. The audio subnetwork 115 may contain any number of layers. The audio subnetwork 115 outputs an audio feature vector 155 based on the stacked audio representations 145.

The merging subsystem 125 receives the audio feature vector 155 and the visual feature vector 160 and merges the two over the time domain. The merging subsystem 125 may reduce and/or flatten one or both of the visual feature vector 160 and the audio feature vector 155. In some embodiments, the merging subsystem 125 may reduce and/or flatten the merged audio-visual feature vector 165. In some embodiments, the merging subsystem 125 flattens and/or reduces the visual feature vector 160 without spatial pooling prior to merging it with the audio feature vector 155. The merging subsystem 125 outputs the merged audio-visual feature vector 165.

The pretext subnetwork 130 receives the merged audio-visual feature vector 165. The pretext subnetwork may be any type of suitable neural network that can generate a classification. The pretext subnetwork 130 classifies the audio-visual feature vector 165 into one of two subgroups. The audio-visual feature vector 165 is classified into one of two subgroups where one subgroup indicates the audio-visual feature vector 165 represents an audio-visual clip in which the audio-visual spatial relationship is misaligned and the second subgroup indicates the audio-visual feature vector 165 represents an audio-visual clip in which the audio-visual spatial relationship is not misaligned. If the pretext subnetwork 130 determines the audio-visual spatial relationship is misaligned for the represented audio-visual clip based on the audio-visual spatial cues supplied in the audio-visual feature vector 165, the pretext subnetwork 130 classifies the audio-visual feature vector 165 into the first subgroup. If the pretext subnetwork 130 determines the audio-visual spatial relationship is not misaligned for the represented audio-visual clip based on the audio-visual spatial cues supplied in the audio-visual feature vector 165, the pretext subnetwork 130 classifies the audio-visual feature vector 165 into the second subgroup. The pretext subnetwork 130 may include a concatenation layer 255, a convolution layer 260, an average pooling layer 265, and a classification layer 270. Average pooling involves calculating the average for each portion of a feature vector based on a dimension of the vector. In some embodiments, the pooling performed in average pooling layer 265 is across a single dimension (e.g., time or space) rather than across multiple dimensions (e.g., time and space). Further, the average pooling is completed after concatenating the spatial information contained in the audio and visual features as described above.

Figure 3:
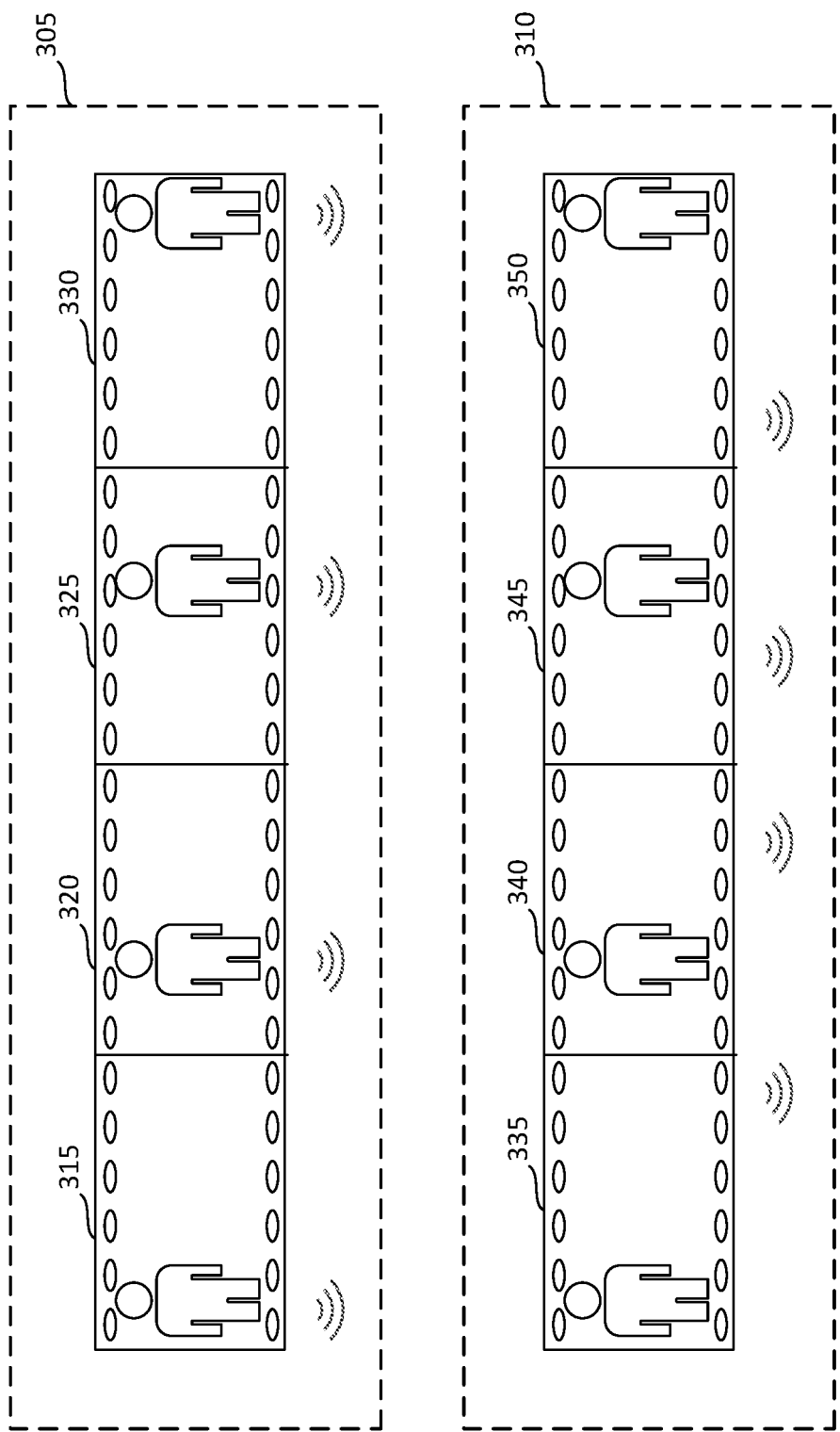
FIG. 3 illustrates an example of audio-visual spatial correspondence input to the training system of FIG. 1, according to certain embodiments.

FIG. 3 illustrates audio-visual clips 305 and 310. In audio-visual clip 305, the audio-visual spatial alignment is intact. In audio-visual clip 310, the audio-visual spatial alignment is disrupted because the right and left audio channels were switched. Audio-visual clip 305 includes frames 315, 320, 325, and 330 and the corresponding audio channel information is shown below each frame. As shown, the speaker begins on the left in frame 315 and moves to the right in frames 320 and 325, ending on the right side of the frame 330. The audio information follows the speaker from left to right in each frame.

Audio-visual clip 310 includes frames 335, 340, 345, and 350 and the corresponding audio channel information is shown below each frame. As shown, the speaker begins on the left in frame 335 and moves to the right in frames 340 and 345, ending on the right side of the frame 350. However, the audio information indicates that the speaker is on the right rather than the left in frame 335. Similarly, in frame 350 the audio indicates the speaker is on the left rather than the right. In short, the audio channels are switched.

The neural network 185 is trained to identify that the audio-visual spatial relationship is misaligned (e.g., audio channels in audio-visual clip 310 are switched) using the audio information and the spatial cues of the video in each frame 335, 340, 345, and 350. The neural network 185 is trained using the pretext subnetwork 130 to understand based on the visual information in, for example, frame 335 that the audio should be perceived as coming from primarily the left. When the neural network 185 receives information that the audio is perceived as primarily coming from the right for frame 335, the neural network 185 recognizes that the audio-visual spatial cues are misaligned. The audio-visual spatial cues for a human include, for example, the volume (e.g., energy) differences between the audio channels and the difference in time of arrival at the ear for each channel. Accordingly, those values may be used by the system to identify spatial cues.

Figure 4:
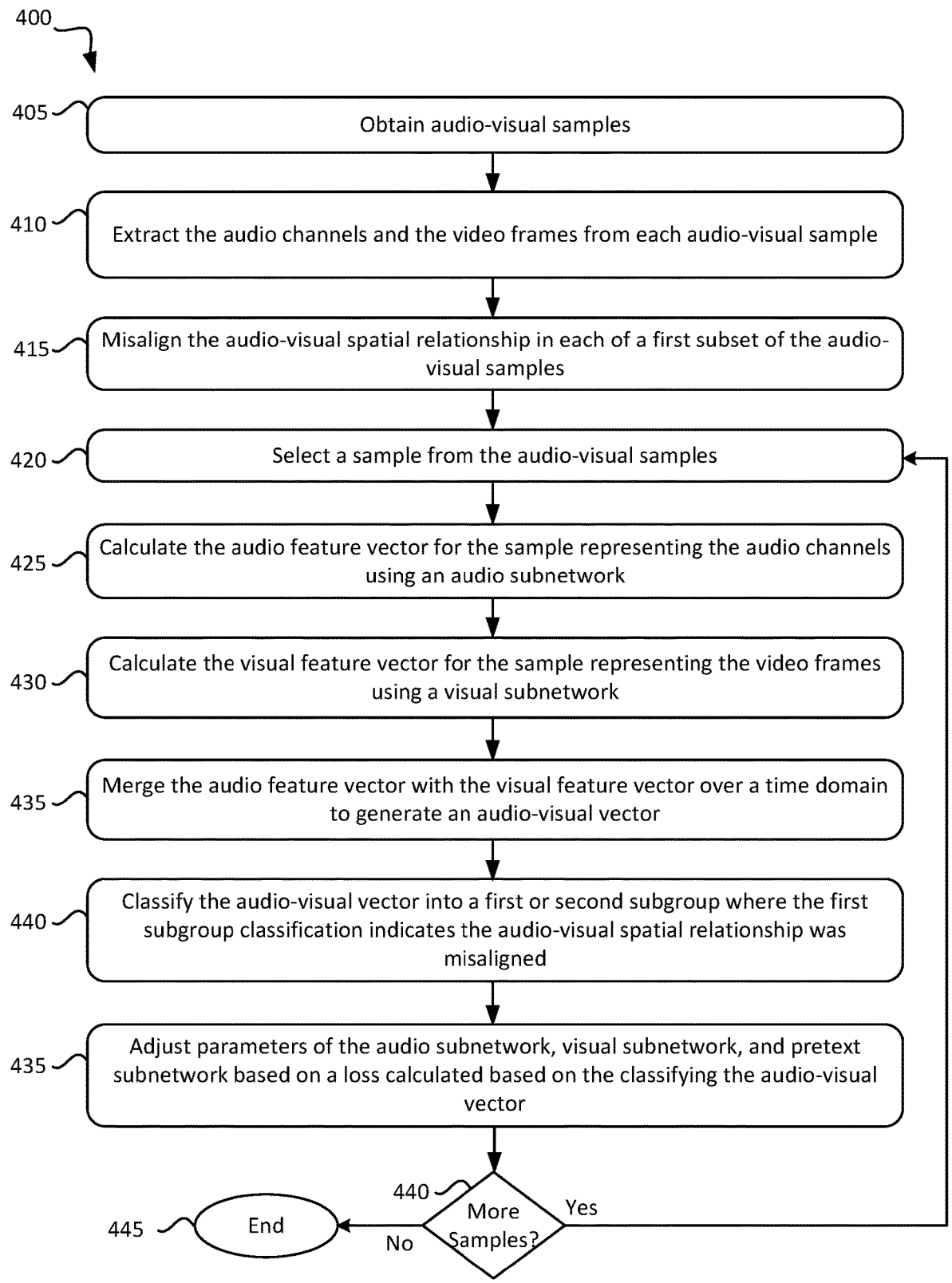
FIG. 4 illustrates an example method for training a neural network to understand audio-visual spatial correspondence, according to certain embodiments.

FIG. 4 illustrates a method 400 for training a network to interpret audio-visual spatial correspondence. The method 400 may be performed by training system 100 as depicted with respect to FIG. 1. At step 405, a preprocessing subsystem may obtain audio-visual samples. For example preprocessing subsystem 110 may obtain audio-visual samples from audio-visual sample database 105. The samples may be any length audio-visual clip that contains audio from more than one audio channel.

At step 410, the preprocessing subsystem may extract the audio channels and the video frames from each audio-visual sample. For example, the preprocessing system 110 may extract the right audio channel, the left audio channel, and video frames from the audio-visual clips. As another example, the preprocessing system 110 may extract the ambisonic audio channels and the video frames from the audio-visual clips. In some embodiments, the preprocessing subsystem 110 may randomly, for a portion of the audio-visual clips, misalign the audio-visual spatial relationship either by modifying the audio channels or the video frames and then realign the audio-visual spatial relationship by modifying the other of the audio channels or video frames. This misalignment and realignment can account for bias in the audio-visual samples. For example, the preprocessing subsystem 110 may flip the video frames and switch the right and left audio channels to maintain the audio-visual spatial alignment of the audio-visual clip information and account for right or left bias in the audio-visual clips.

At step 415, the preprocessing subsystem misaligns the audio-visual spatial relationship in a first subset of the audio-visual samples. For example, the preprocessing system may switch a first audio channel and a second audio channel in each of a subset of the audio-visual samples to disrupt the audio-visual spatial alignment (i.e., relationship) in the subset. In some embodiments, the samples in the subset are selected randomly with a 0.5 probability that any audio-visual clip will be misaligned. In some embodiments, the preprocessing subsystem 110 may stack the video frames. In some embodiments, the preprocessing subsystem 110 may generate an audio representation (e.g., a mel-spectrogram) of each audio channel and stack the representations. In many examples throughout this specification, two audio channels referred to as left and right audio channels have been used to describe the way the system works. However, in some embodiments, two channels may be positioned in other locations with respect to the audio-visual clip visual information. For example, the two channels may be above and below the frame of reference for the audio-visual clip such that sound may have the effect of coming from below or above the visual information. Additionally, in some embodiments, there are more than two audio channels (e.g., above, below, right, and left). In some embodiments, there are more than two audio channels and they provide ambisonic audio.

At step 420, the preprocessing system selects a sample from the audio-visual samples. For example, preprocessing subsystem 110 selects one audio-visual clip and, particularly, selects the extracted video frame stack and the stacked audio representations (e.g., mel-spectrograms) of the audio channels for the audio-visual clip and provides them to a visual subnetwork and an audio subnetwork, respectively.

At step 425, the audio subnetwork calculates the audio feature vector for the sample based on the first and second audio channels. For example, the audio subnetwork 115 calculates the audio feature vector 155 for the audio-visual clip based on the stacked audio representations 145 as described with respect to FIGS. 1 and 2.

At step 430, the visual subnetwork calculates the visual feature vector for the sample based on the video frames. For example, the visual subnetwork 120 calculates the visual feature vector 160 for the audio-visual clip based on the stacked video frames 150 as described with respect to FIGS. 1 and 2.

At step 435, the merging subsystem merges the audio feature vector with the visual feature vector over a time domain to generate an audio-visual vector. For example, merging subsystem 125 merges the audio feature vector 155 with the visual feature vector 160 over the time domain to generate the audio-visual vector 165 as described with respect to FIGS. 1 and 2.

At step 440, the pretext subnetwork classifies the audio-visual vector into a first or second subgroup where the first subgroup classification indicates the first audio channel and the second audio channel were switched. For example, the pretext subnetwork 130 classifies the audio-visual vector 165 into a subgroup if the pretext subnetwork 130 determines that the audio-visual spatial relationship was misaligned by the preprocessing subsystem 110 and into a different subgroup if the pretext subnetwork 130 determines that the audio-visual spatial relationship was not misaligned (or, in some embodiments, was realigned) such that the audio-visual spatial relationship is aligned.

At step 445, the network adjusts parameters of the audio subnetwork, visual subnetwork, and pretext subnetwork based on a loss calculated based on the classifying the audio-visual vector. For example, the loss function subsystem 135 receives the known classification 180 from the preprocessing subsystem 110 and the classification 170 from the pretext subnetwork 130. The loss function subsystem 135 determines whether the classification 170 was correct or not based on the known classification 180. If the classification 170 was correct, the loss 175 provides an indication that the classification 170 was correct to the pretext subnetwork 130, the audio subnetwork 115, and the visual subnetwork 120. In some embodiments, the indication that the classification was correct is a reward to the pretext subnetwork 130, the audio subnetwork 115, and the visual subnetwork 120, which may adjust parameters in response to the reward. If the classification 170 was incorrect, the loss 175 provides an indication that the classification 170 was incorrect to the pretext subnetwork 130, the audio subnetwork 115, and the visual subnetwork 120. In some embodiments, the loss 175 may penalize the pretext subnetwork 130, the audio subnetwork 115, and the visual subnetwork 120, which may adjust parameters to more accurately classify in the future.

At decision block 450, the preprocessing subsystem may determine whether there are additional training samples. For example, preprocessing subsystem 110 may determine whether there are additional audio-visual clips to be used for training. If so, the preprocessing subsystem 110 will select another sample at step 420. If not, the training ends at step 445.

Examples of Computing Environments for Implementing Certain Embodiments

Figure 5:
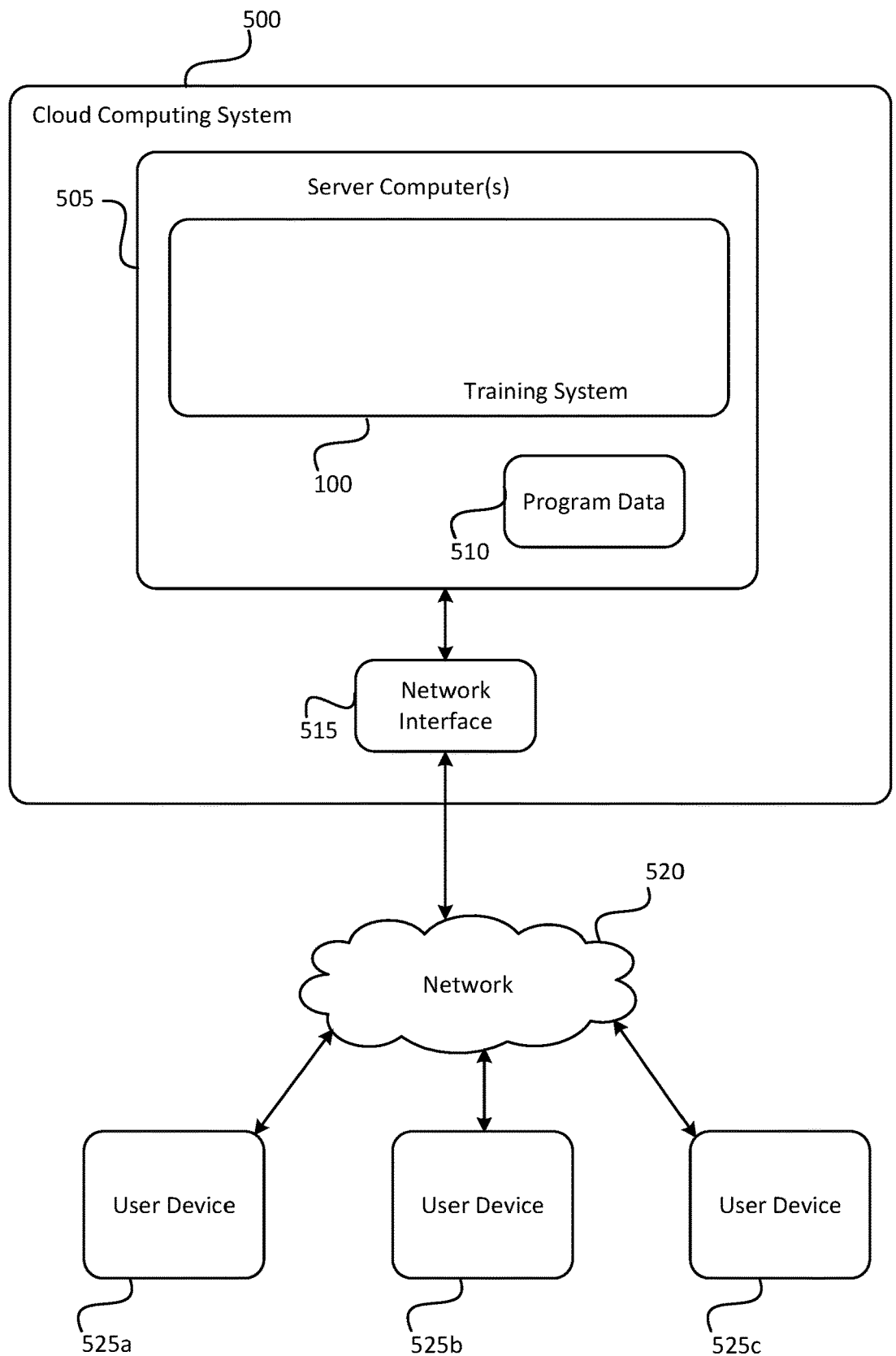
FIG. 5 illustrates an example of a cloud computing system that may implement the neural network, according to certain embodiments.
Figure 6:
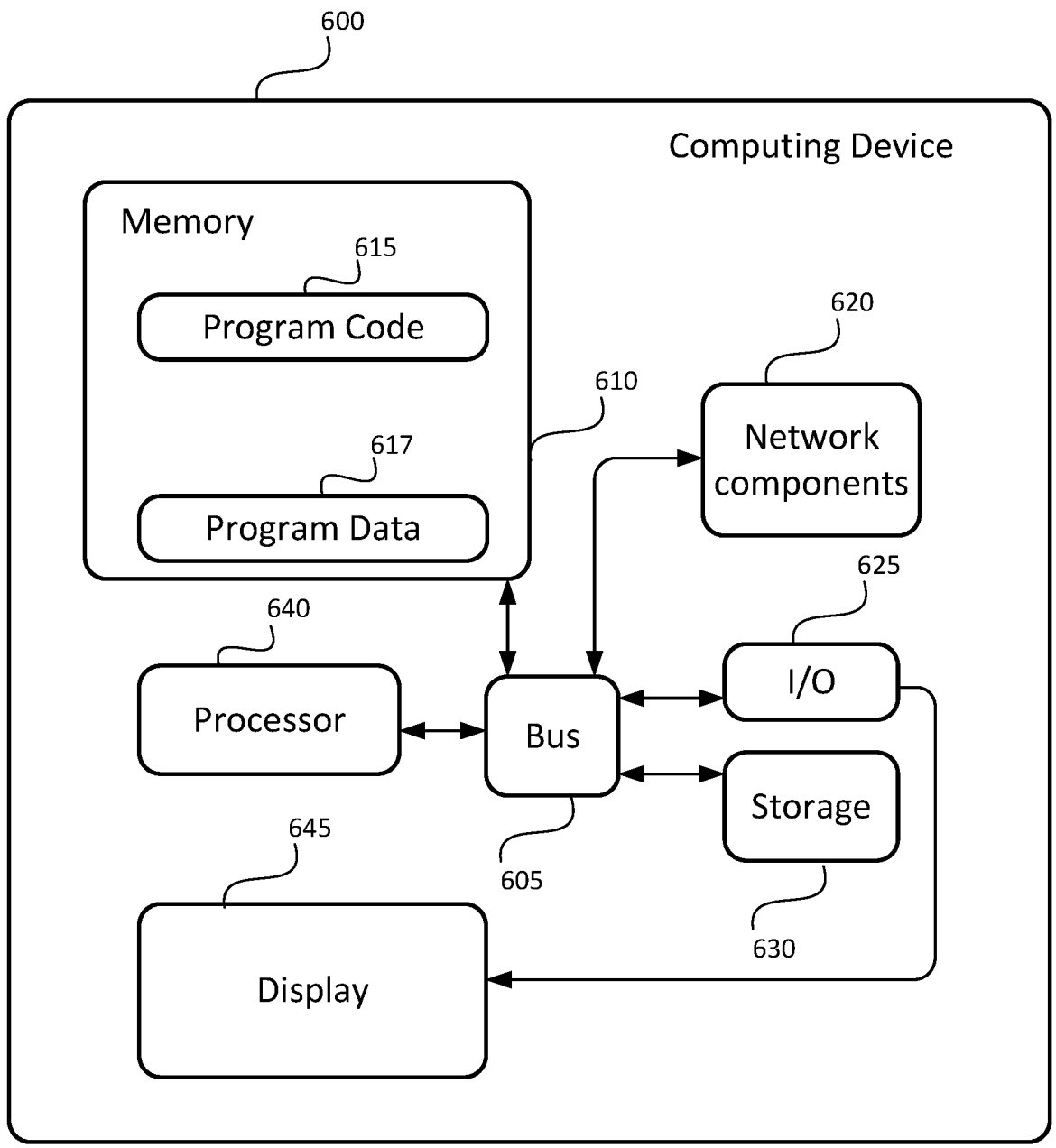
FIG. 6 illustrates an example of a computing device that may implement the training system, according to certain embodiments.

Any suitable computing system or group of computing systems can be used for performing the operations described herein. For example, FIG. 5 illustrates a cloud computing system 500 by which at least a portion of the training system 100 may be offered. FIG. 6 depicts an example of a computing device 600 that may be at least a portion of training system 100. In an embodiment, a single training system 100 having devices similar to those depicted in FIG. 6 (e.g., a processor, a memory, etc.) combines the one or more operations and data stores depicted as separate subsystems in FIG. 1.

In some embodiments, the functionality provided by the training system 100 may be offered as cloud services by a cloud service provider. For example, FIG. 5 depicts an example of a cloud computing system 500 offering a training service that can be used by a number of user subscribers using user devices 525a, 525b, and 525c across a data network 520. User devices 525a, 525b, and 525c could be examples of a user system used to access training system 100. In the example, the training service or the trained neural networks may be offered under a Software as a Service (SaaS) model. One or more users may subscribe to the training service or trained neural networks, and the cloud computing system performs the processing to provide the training or neural network services to subscribers. The cloud computing system may include one or more remote server computers 505.

The remote server computers 505 include any suitable non-transitory computer-readable medium for storing program code (e.g., a training system 100) and program data 510, or both, which is used by the cloud computing system 500 for providing the cloud services. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C #, Visual Basic, Java, Python, Perl, JavaScript, and ActionScript. In various examples, the server computers 505 can include volatile memory, non-volatile memory, or a combination thereof.

One or more of the servers 505 execute the program code that configures one or more processors of the server computers 505 to perform one or more of the operations that provide training or neural network services, including the ability to utilize the preprocessing subsystem 110, audio subnetwork 115, visual subnetwork 120, merging subsystem 125, pretext subnetwork 130, neural network 185, and/or the loss function subsystem 135 to perform training or utilize the trained neural networks. As depicted in the embodiment in FIG. 5, the one or more servers provide the services to perform audio-visual spatial correlation via the training system 100. Any other suitable systems or subsystems that perform one or more operations described herein (e.g., one or more development systems for configuring an interactive user interface) can also be implemented by the cloud computing system 500.

In certain embodiments, the cloud computing system 500 may implement the services by executing program code and/or using program data 510, which may be resident in a memory device of the server computers 505 or any suitable computer-readable medium and may be executed by the processors of the server computers 505 or any other suitable processor.

In some embodiments, the program data 510 includes one or more datasets and models described herein. Examples of these datasets include audio-visual data such as audio-visual clips, feature vectors, etc. In some embodiments, one or more of data sets, models, and functions are stored in the same memory device. In additional or alternative embodiments, one or more of the programs, data sets, models, and functions described herein are stored in different memory devices accessible via the data network 515.

The cloud computing system 500 also includes a network interface device 515 that enable communications to and from cloud computing system 500. In certain embodiments, the network interface device 515 includes any device or group of devices suitable for establishing a wired or wireless data connection to the data networks 520. Non-limiting examples of the network interface device 515 include an Ethernet network adapter, a modem, and/or the like. The training system 100 is able to communicate with the user devices 525a, 525b, and 525c via the data network 520 using the network interface device 515.

FIG. 6 illustrates a block diagram of an example of a computer system 600. Computer system 600 can be any of the described computers herein including, for example, training system 100. The computing device 600 can be or include, for example, a laptop computer, desktop computer, tablet, server, or other electronic device.

The computing device 600 can include a processor 640 interfaced with other hardware via a bus 605. A memory 610, which can include any suitable tangible (and non-transitory) computer readable medium, such as RAM, ROM, EEPROM, or the like, can embody program components (e.g., program code 615) that configure operation of the computing device 600. Memory 610 can store the program code 615, program data 617, or both. In some examples, the computing device 600 can include input/output ("I/O") interface components 625 (e.g., for interfacing with a display 645, keyboard, mouse, and the like) and additional storage 630.

The computing device 600 executes program code 615 that configures the processor 640 to perform one or more of the operations described herein. Examples of the program code 615 include, in various embodiments, the preprocessing subsystem 110, audio subnetwork 115, visual subnetwork 120, merging subsystem 125, pretext subnetwork 130, loss function subsystem 135, or any other suitable systems or subsystems that perform one or more operations described herein. The program code 615 may be resident in the memory 610 or any suitable computer-readable medium and may be executed by the processor 640 or any other suitable processor.

The computing device 600 may generate or receive program data 617 by virtue of executing the program code 615. For example, audio-visual clips and feature vectors are examples of program data 617 that may be used by the computing device 600 during execution of the program code 615.

The computing device 600 can include network components 620. Network components 620 can represent one or more of any components that facilitate a network connection. In some examples, the network components 620 can facilitate a wireless connection and include wireless interfaces such as IEEE 802.11, Bluetooth, or radio interfaces for accessing cellular telephone networks (e.g., a transceiver/antenna for accessing CDMA, GSM, UMTS, or other mobile communications network). In other examples, the network components 620 can be wired and can include interfaces such as Ethernet, USB, or IEEE 1394.

Although FIG. 6 depicts a single computing device 600 with a single processor 640, the system can include any number of computing devices 600 and any number of processors 640. For example, multiple computing devices 600 or multiple processors 640 can be distributed over a wired or wireless network (e.g., a Wide Area Network, Local Area Network, or the Internet). The multiple computing devices 600 or multiple processors 640 can perform any of the steps of the present disclosure individually or in coordination with one another.

GENERAL CONSIDERATIONS

While the present subject matter has been described in detail with respect to specific aspects thereof, it will be appreciated that those skilled in the art, upon attaining an understanding of the foregoing, may readily produce alterations to, variations of, and equivalents to such aspects. Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. Accordingly, the present disclosure has been presented for purposes of example rather than limitation, and does not preclude the inclusion of such modifications, variations, and/or additions to the present subject matter as would be readily apparent to one of ordinary skill in the art Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Aspects of the methods disclosed herein may be performed in the operation of such computing devices. The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device. The order of the blocks presented in the examples above can be varied—for example, blocks can be re-ordered, combined, and/or broken into sub-blocks. Certain blocks or processes can be performed in parallel.

What is claimed is:

1. A computer-implemented method for training a network to interpret audio-visual spatial correspondence, the method comprising: obtaining, by a preprocessing subsystem, a plurality of audio-visual samples; extracting, by the preprocessing subsystem for each audio-visual sample, a plurality of audio channels and a plurality of video frames; misaligning, by the preprocessing subsystem, an audio-visual spatial relationship in each of a first subset of the plurality of audio-visual samples; and for each of the plurality of audio-visual samples: calculating, with an audio subnetwork of the network, an audio feature vector for the respective audio-visual sample based on the plurality of audio channels of the respective audio-visual sample, wherein calculating the audio feature vector for the respective audio-visual sample comprises receiving, at the audio subnetwork, a first audio representation representing a first audio channel of the plurality of audio channels stacked with a second audio representation representing a second audio channel of the plurality of audio channels; calculating, with a visual subnetwork of the network, a visual feature vector for the respective audio-visual sample based on the plurality of video frames of the respective audio-visual sample; merging, with a merging subsystem of the network, the audio feature vector with the visual feature vector over a time domain to generate an audio-visual vector; classifying, with a pretext subnetwork of the network, the audio-visual vector into one of a first subgroup or a second subgroup, wherein the first subgroup classification indicates the audio-visual spatial relationship is misaligned in the respective audio-visual sample; and adjusting, by the network, parameters of the audio subnetwork, the visual subnetwork, and the pretext subnetwork based on a loss calculated based on classification of the audio-visual vector.

2. The method of claim 1, wherein misaligning the audio-visual spatial relationship comprises randomly selecting the first subset from the plurality of audiovisual samples.

3. The method of claim 1, wherein misaligning the audio-visual spatial relationship comprises randomly selecting the first subset from the plurality of audio-visual samples using a probability of 0.5.

4. The method of claim 1, wherein: the audio-visual samples comprise field-of-view video with binaural audio; the audio-visual spatial relationship between a first audio channel in a first audiovisual sample and the plurality of video frames in the first audio-visual sample represents, before the misaligning, audio generated from an object represented in a left portion of the plurality of video frames; the audio-visual spatial relationship between a second audio channel in the first audio-visual sample and the plurality of video frames in the first audio-visual sample represents, before the misaligning, audio generated from an object represented in a right portion of the plurality of video frames; and wherein the misaligning comprises switching the first audio channel and the second audio channel.

5. The method of claim 1, wherein the first audio representation is one of a spectrogram, a mel-spectrogram, or a raw audio waveform.

6. The method of claim 1, wherein classifying the audio-visual vector comprises average pooling across a single dimension.

7. The method of claim 1, wherein adjusting parameters of the audio subnetwork, the visual subnetwork, and the pretext subnetwork comprises: receiving, by a loss function subsystem, a known classification for the audiovisual vector; receiving, by the loss function subsystem, the classification of the audio-visual vector from the pretext subnetwork; calculating the loss based on a determination of whether the pretext subnetwork correctly classified the audio-visual vector using the known classification; and provide the loss to the audio subnetwork, the visual subnetwork, and the pretext subnetwork.

8. The method of claim 1, wherein merging the audio feature vector with the visual feature vector over the time domain comprises: reducing and flattening the visual feature vector without spatial pooling to generate a reduced visual feature vector; and merging the audio feature vector with the reduced visual feature vector over the time domain.

9. The method of claim 1, further comprising: misaligning, by the preprocessing subsystem, the audio-visual spatial relationship in each of a second subset of the plurality of audio-visual samples by modifying the plurality of audio channels; and realigning, by the preprocessing subsystem, the audio-visual spatial relationship in each of the second subset of the plurality of audio-visual samples by modifying the plurality of video frames.

10. The method of claim 1, wherein the audio-visual samples comprise 360-degree video and ambisonic audio.

11. A system for training a network to interpret audiovisual spatial correspondence, the system comprising: one or more processors; and a memory having stored thereon instructions that, upon execution by the one or more processors, cause the one or more processors to: receive a plurality of audio-visual samples; extract, for each audio-visual sample, a plurality of audio channels and a plurality of video frames; misalign an audio-visual spatial relationship in each of a first subset of the plurality of audio-visual samples; and for each of the plurality of audio-visual samples: calculate, with an audio subnetwork of the system, an audio feature vector for the respective audio-visual sample based on the plurality of audio channels of the respective audio-visual sample, wherein calculating the audio feature vector for the respective audio-visual sample comprises receiving, at the audio subnetwork, a plurality of mel-spectrograms, wherein each mel-spectrogram represents an audio channel of the plurality of audio channels, and wherein the plurality of mel-spectrograms are stacked; calculate, with a visual subnetwork of the system, a visual feature vector for the respective audio-visual sample based on the plurality of video frames of the respective audio-visual sample; merge, with a merging subsystem of the system, the audio feature vector with the visual feature vector over a time domain to generate an audio-visual vector; classify, with a pretext subnetwork of the system, the audio-visual vector into one of a first subgroup or a second subgroup, where the first subgroup classification indicates the audio-visual spatial relationship is misaligned in the respective audio-visual sample; and adjust parameters of the audio subnetwork, visual subnetwork, and pretext subnetwork based on a loss calculated based on the classifying the audio-visual vector.

12. The system of claim 11, wherein the instructions to misalign the audio-visual spatial relationship comprises further instructions that, upon execution by the one or more processors, causes the one or more processors to randomly select the first subset from the plurality of audio-visual samples using a probability of 0.5.

13. The system of claim 11, wherein the audio-visual samples comprise 360-degree video and ambisonic audio.

14. The system of claim 11, wherein the instructions to classify the audio-visual vector comprises further instructions that, upon execution by the one or more processors, causes the one or more processors to use average pooling across a single dimension.

15. The system of claim 11, wherein the instructions to adjust the parameters of the audio subnetwork, visual subnetwork, and pretext subnetwork comprises further instructions that, upon execution by the one or more processors, causes the one or more processors to: receive, by a loss function subsystem of the system, a known classification for the audio-visual vector; receive, by the loss function subsystem, the classification of the audio-visual vector from the pretext subnetwork; calculate the loss based on a determination of whether the pretext subnetwork correctly classified the audio-visual vector using the known classification; and provide the loss to the audio subnetwork, the visual subnetwork, and the pretext subnetwork.

16. The system of claim 11, wherein the audio-visual samples comprise field-of-view video and multi-channel audio.

17. The system of claim 16, wherein: the audio-visual spatial relationship between a first audio channel in a first audiovisual sample and the plurality of video frames in the first audio-visual sample represents, before the misaligning, audio generated from an object represented in a left portion of the plurality of video frames; the audio-visual spatial relationship between a second audio channel in the first audio-visual sample and the plurality of video frames in the first audio-visual sample represents, before the misaligning, audio generated from an object represented in a right portion of the plurality of video frames; and wherein the instructions to misalign comprises further instructions that, upon execution by the one or more processors, cause the one or more processors to switch the first audio channel and the second audio channel.

18. The system of claim 11, wherein the instructions to merge the audio feature vector with the visual feature vector over the time domain comprises further instructions that, upon execution by the one or more processors, cause the one or more processors to: reduce and flatten the visual feature vector without spatial pooling to generate a reduced visual feature vector; and merge the audio feature vector with the reduced visual feature vector over the time domain.

\* \* \* \* \*